United States Patent [19]
Stavropoulos et al.

[11] Patent Number: 5,676,719
[45] Date of Patent: Oct. 14, 1997

[54] UNIVERSAL INSERT FOR USE WITH RADIATOR STEAM TRAPS

[75] Inventors: Constantine N. Stavropoulos, Northbrook; Lianquan Liu, Carol Stream; Panos N. Stavropoulos, Vernon Hills, all of Ill.

[73] Assignee: Engineering Resources, Inc., Elk Grove Village, Ill.

[21] Appl. No.: 595,228

[22] Filed: Feb. 1, 1996

[51] Int. Cl.[6] ............................. B01D 35/02
[52] U.S. Cl. .............. 55/466; 55/DIG. 23; 137/549; 138/41; 138/44; 210/451
[58] Field of Search .................. 55/466, 392, 320, 55/DIG. 23; 95/260; 138/41, 44; 210/446, 449, 451; 137/549, 550

[56] References Cited

U.S. PATENT DOCUMENTS

| | | | |
|---|---|---|---|
| 1,899,251 | 2/1933 | Zerk | 138/41 |
| 2,604,958 | 7/1952 | Leufvenius | 138/41 X |
| 3,715,870 | 2/1973 | Guzick | 210/446 X |
| 3,877,895 | 4/1975 | Wonderland et al. | 55/466 X |
| 4,171,209 | 10/1979 | Brown | 55/503 X |
| 4,263,140 | 4/1981 | Wujnovich et al. | 210/446 X |
| 4,426,213 | 1/1984 | Stavropoulos | 138/41 X |
| 4,486,208 | 12/1984 | Stavropoulos | 55/466 |
| 5,120,336 | 6/1992 | LeBlanc | 55/466 |
| 5,123,452 | 6/1992 | LeBlanc | 55/466 X |
| 5,137,556 | 8/1992 | Koulogeorgas | 137/549 X |
| 5,315,859 | 5/1994 | Schommer | 138/44 X |
| 5,373,873 | 12/1994 | Miller et al. | 138/44 X |

*Primary Examiner*—Richard L. Chiesa
*Attorney, Agent, or Firm*—Niro, Scavone, Haller & Niro

[57] ABSTRACT

A universal insert used with a device to drain condensate from a steam system while minimizing the passage of steam. The insert includes an anchor with tapering threads that can be crushed, permitting the insert to be used with radiator steam traps having differing sizes, and of different models. Nozzle or orifice-type constricted passageways can be located within the anchor. A filter device for use with the anchor has an adjustable height.

7 Claims, 3 Drawing Sheets

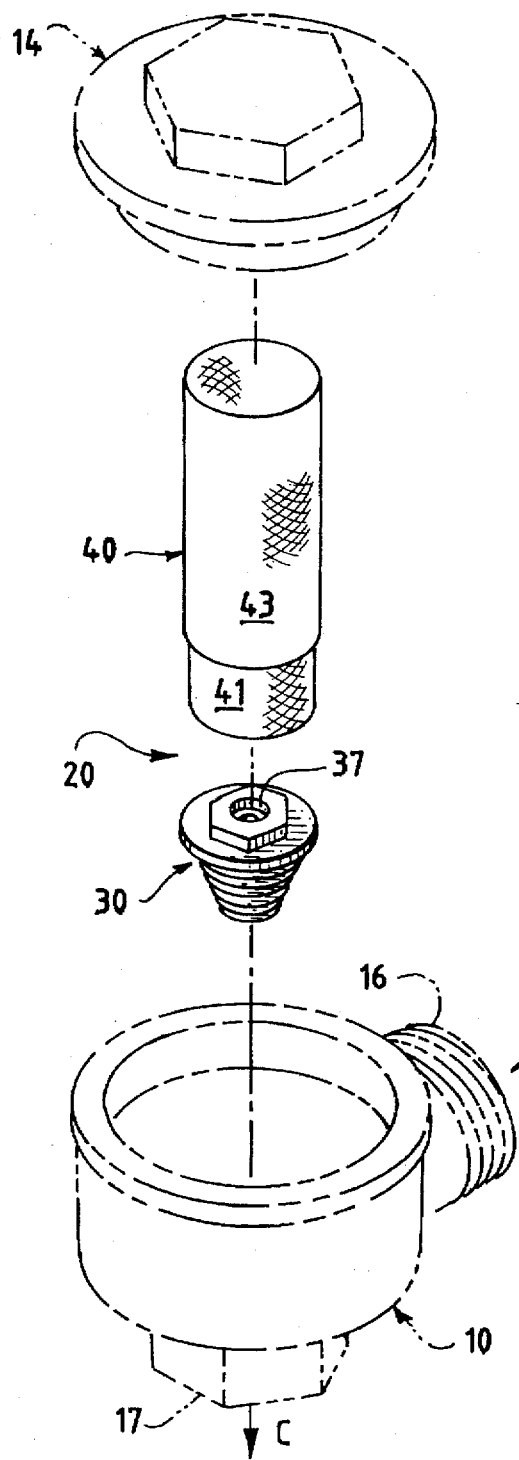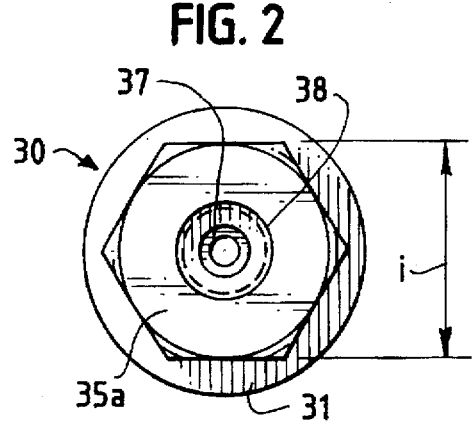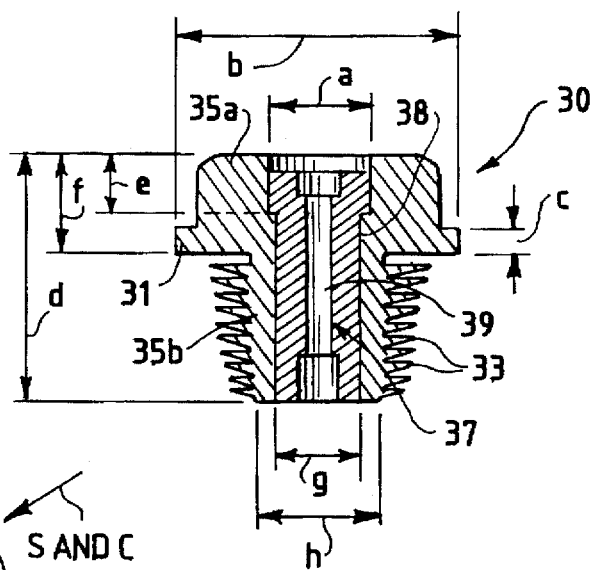

UNIVERSAL INSERT FOR USE WITH RADIATOR STEAM TRAPS

BACKGROUND

This invention relates to liquid drainage devices for fluid conduit systems. More particularly, this invention relates to an improved device for removing condensate from steam lines.

Steam piping systems must be provided with equipment to remove the condensate which accumulates as heat is lost from the steam. Generally, condensate removal equipment is located at low points or pockets in the steam piping and at regular intervals in the extended runs of the steam piping, as well as at steam-driven equipment which could be damaged by condensate. Older equipment, such as the widely employed inverted bucket condensate trap, has increasingly been replaced with more simplified orifice devices, such as those devices described in U.S. Pat. Nos. 3,715,870 and 3,877,895, in which a plate having an orifice is positioned in the steam line enabling condensate to be forced through the small diameter orifice by the high pressure steam; when the orifice is properly sized, condensate obstructs passage of steam through the orifice, minimizing steam loss while permitting drainage of the condensate.

U.S. Pat. No. 4,171,209 (the '209 patent) describes an orifice device formed in the body of a fitting which can be conveniently connected directly into the steam line, preferably downstream from a conventional Y-strainer which removes particulate debris from the accumulated condensate. Such orifice devices permit the continuous flow and removal of condensate, and have proven effective and commercially successful. A successful improvement to the use of an orifice has been the use of interchangeable tubular nozzles having particularly sized constricted passageways which can be removed and replaced to accommodate variation in steam pressures while minimizing steam loss. Such nozzles provide better flow characteristics than the orifice-type devices, and are disclosed in U.S. Pat. Nos. 4,486,208 and 4,426,213 (the '208 and '213 patents), each of which is commonly assigned and the disclosures of which are hereby incorporated by reference in their entirety into this disclosure. Examples of these nozzles are shown in FIGS. 4A-4D and 5.

Conventional radiator steam traps (RSTs) often utilize a thermostatic trap mechanism. This type of trap use a "bellows"—type approach; in one such design, annular discs contain a liquid which evaporates when heated with steam, causing the bellows to expand to close the steam discharge opening. When the bellows are surrounded by sub-cooled condensate, they will contract to open the discharge opening. This bellows movement permits the thermostatic trap to intermittently discharge condensate without discharging steam. Barnes & Jones of Newtonville, Me. and Armstrong (Steam Specialty Products) of Three Rivers, Mich. each manufactures such units, an example of which is shown in FIG. 6. FIG. 6 illustrates the movable annular discs 110 contained within housing 140 of the thermostatic device; ball 130 moves into and out of aperture 135 to intermittently permit the flow of condensate through opening 170. Seat 150 and spring 160 permit engagement with a steam trap body.

A problem with the thermostatic units is that they must be offered in many different sizes to accommodate numerous makes and models of existing steam straps. With the Barnes & Jones RST "cage" units, for example, tens of different cage units, each with different sizes and different spring heights, are offered to accommodate steam lines with differing sizes and pressures. Similarly, the Armstrong RST "renewal capsule" is threadably connected or press fit to the radiator steam trap seat; again, this requires seat adapters of numerous sizes to accommodate differently-sized steam traps.

Other commercially available RSTs which utilize interchangeable nozzle devices may include screens which are spring-loaded for secure engagement within the RST body, and if the screen height or diameter is changed, the entire screen may require replacement as well.

The repair of RST units can be further complicated if the original equipment manufacturer is no longer available to supply repair parts. Finally, the use of moving parts, such as thermostatic devices, increases required maintenance.

While the "orifice" and "interchangeable nozzle" devices described in the '209, '208, and '213 patents (as shown, for example, in FIGS. 4 and 5) have dramatically improved the effective and economic use and maintenance of steam lines and steam trap devices, further improvements are still possible. Manufacturers of such devices for commercially available radiator steam trap devices are still required to offer a variety of interchangeable nozzle sizes and diameters, for example, to accommodate use in steam lines of various sizes and pressures. The screens used with different RST bodies also must be sized appropriately.

It would, therefore, be advantageous to provide a universal or nearly universal RST insert assembly that could be used both with new RST assemblies or as a repair kit to retrofit existing RSTs. Such universal RST inserts would simplify the use of RSTs, reduce their repair and maintenance costs, and offer a host of ancillary advantages. For example, the variety of spare parts necessary for RST maintenance would be greatly reduced, and users would have the ability to replace internal RST components without having to replace the RST body itself, or without being required to disconnect the RST body from the steam system. Current advantages recognized with the interchangeable nozzle devices, including enhanced flow characteristics, ease of replacement, dependability, and the lack of any moving parts, would also be retained.

SUMMARY OF THE INVENTION

The present invention preserves the advantages of known radiator steam trap devices. In addition, it provides new advantages not found in such currently available devices, and overcomes many of the disadvantages of such devices.

The device of the present invention is used to drain condensate from a steam system while minimizing the passage of steam. A universal insert is insertable within the housing of the device. The housing has a fluid flow conduit and a seat, and is connected in-line with the steam system. The universal insert includes an anchor which is threaded and is attachable to the seat within the housing. The anchor has an internal opening enclosing a nozzle with a constricted passageway communicating with fluid flow within the steam system. The constricted passageway of the nozzle serves to enhance the flow of condensate from the steam system yet restrict the passage of live steam. The threads on the anchor taper so that the thread diameter decreases as the threads are located closer to the seat. The threads can also be crushed or "crashed" to permit the insert to engage housing seats of differing dimensions.

In a preferred embodiment, the universal insert includes a filter device located adjacent the anchor and configured to surround an upstream portion of the nozzle passageway. The filter device preferably has a height which is selectively adjustable. In one embodiment, the filter device includes two or more frictionally engageable screens, with at least one of the screens being slidable relative to at least one other of the screens.

The anchor can house a first tubular nozzle with an internal constricted passageway, and at least a second tubular nozzle interchangeable with the first nozzle. The second nozzle has an internal constricted passageway which is selected to be different in configuration than that of the first nozzle. This enables variation in the constricted passageway, and permits the selection of nozzles useable with different steam pressures and with different condensate amounts in the steam systems.

Alternatively, the anchor may include an orifice with a constricted passageway rather than a tubular nozzle.

A method for connecting a universal insert to a device used to drain condensate from a steam system while minimizing the passage of steam is also disclosed. The device is connected in-line with the steam system, and includes a housing with a seat. The method consists of the following steps. First, the internal portion of the housing is exposed. Next an anchor is positioned upright and placed inside the housing. The anchor includes an opening that either houses a nozzle or that is drilled into the body of the anchor; the nozzle (in the former case) or the drilled orifice (in the latter case) includes or forms a constricted passageway that serves to enhance the flow of condensate from the steam system yet restrict the passage of live steam. The anchor also has tapering, crashable threads about a lower portion of its periphery. Now, the threads of the anchor are positioned above the seat, and the anchor is lowered, permitting it to engage the seat. At least a portion of the threads of the anchor can be crashed to facilitate engagement of the anchor with the seats having differing dimensions.

A filter device can be positioned over at least a portion of the engaged anchor. The filter device preferably has a selectively adjustable height.

BRIEF DESCRIPTION OF THE DRAWING

The novel features which are characteristic of the present invention are set forth in the appended claims. However, the preferred embodiments of the invention, together with further objects and attendant advantages, will be best understood by reference to the following detailed description taken in connection with the accompanying drawings in which:

FIG. 1 is a perspective view of the components of the RST insert assembly of the present invention, with the body of the steam trap appearing in dotted lines;

FIG. 2 is a top, exploded view of the universal nozzle anchor of the present invention;

FIG. 3 is a side enlarged and cross-sectional view of the universal nozzle anchor;

DESCRIPTION OF THE PREFERRED EMBODIMENTS

Figure 4A:
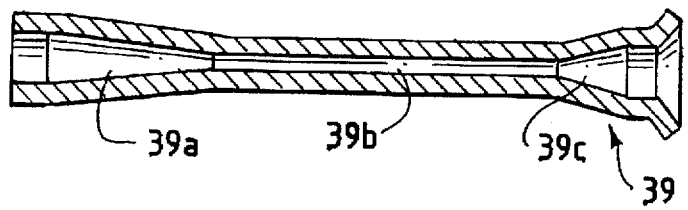
FIGS. 4A–4D are side cross-sectional views of tubular nozzle structures of the type disclosed in the '208 and '213 patents.
Figure 4B:
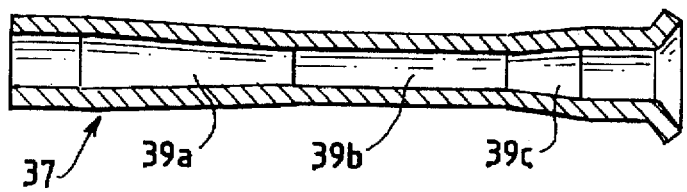
Figure 4C:
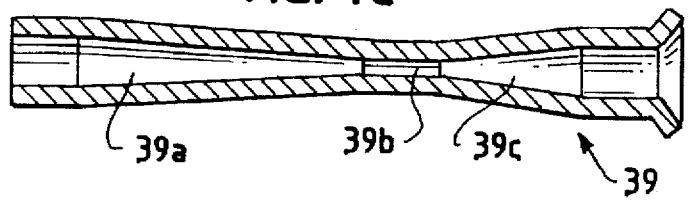
Figure 4D:
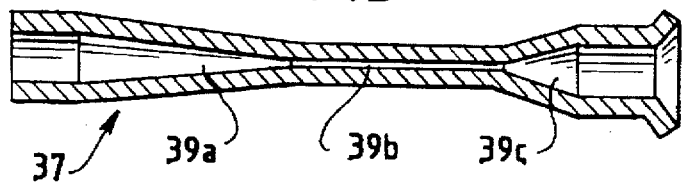

Referring first to FIG. 1, the universal insert assembly of the present invention, generally designated as 20, includes universal nozzle anchor 30 and universal screen filter 40. Universal insert 20 is shown in disassembled form, and is intended to be attached to the body or housing 10 of a radiator steam trap in the manner described below. The directions of steam and condensate flow are indicated by the arrows labeled "S" and "C," respectively. Thus, a steam and condensate mixture enters RST body opening 16, while only condensate passes RST body exit 17.

Still referring to FIG. 1, inner screen 41 of screen filter 40 is designed to frictionally press fit within outer screen 43; the fit should not be so loose that the mere force of gravity will permit relative movement between the screens. In this manner, inner screen 41 is permitted to slide within outer screen 43 when an outside force is applied.

Figure 5:
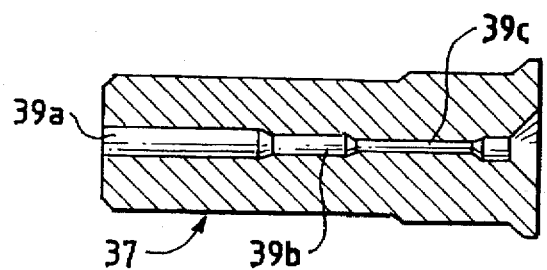
FIG. 5 is an enlarged, cross-sectional side view of an alternative tubular nozzle structure similar to that shown in FIGS. 4A–4D.
Figure 6:
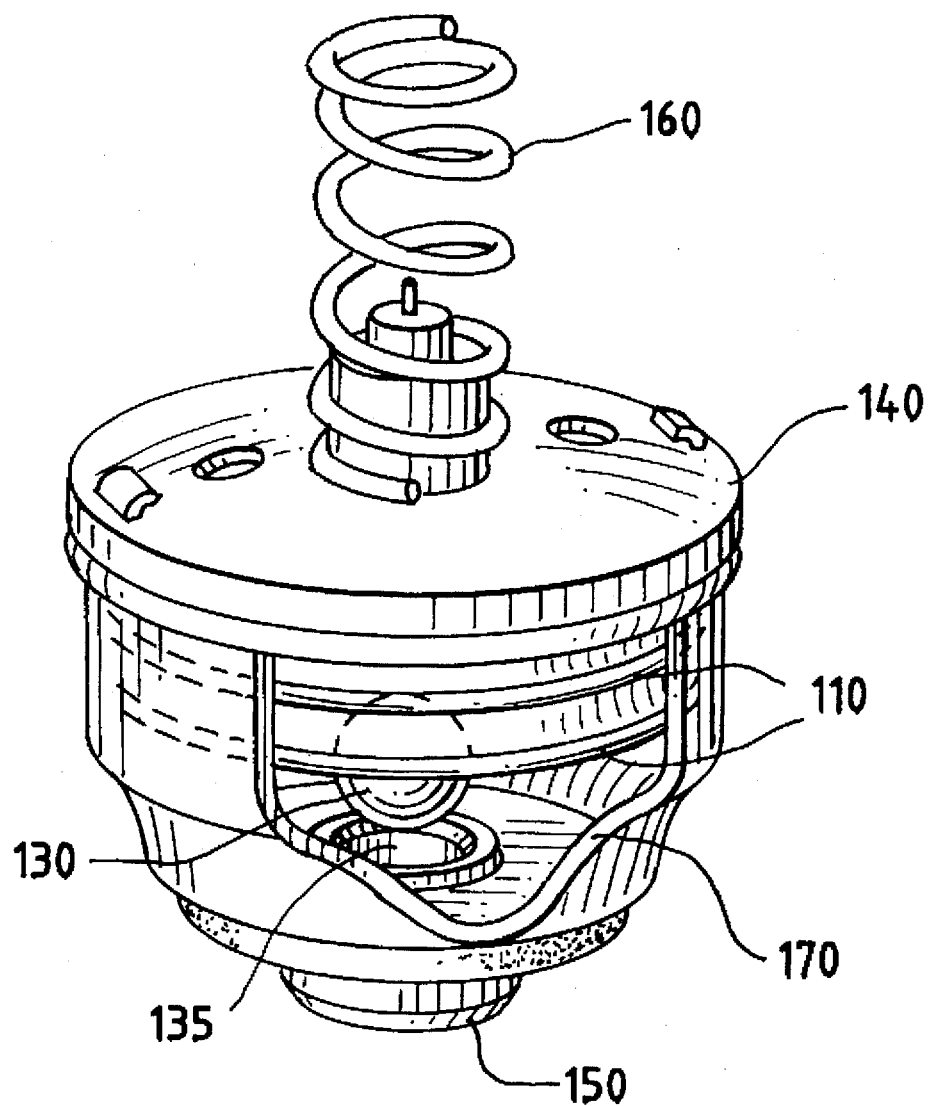
FIG. 6 is a perspective view of a prior art (Barnes & Jones) thermostatic-type RST insert.

Referring now to FIGS. 2 and 3, universal anchor 30 includes anchor body 35. Anchor body 35 has an upper portion terminating in a hexagonally-shaped cap 35a, and a lower portion 35b whose periphery includes threads 33. Anchor 30 includes an internal cylindrical opening 38 which houses a tubular nozzle 37. Nozzle 37 is preferably an interchangeable nozzle of the type manufactured by Engineering Resources, Inc. of Elk Grove Village, Ill., and as disclosed in the '213 and '208 patents, non-limiting examples of which are shown in FIGS. 4 and 5. Nozzle 37 includes a constricted passageway 39. As shown in FIGS. 4 and 5, nozzles 37 may include smooth or stepped constricted passageways 39a, 39b, and 39c of differing diameters.

Referring again to FIG. 3, the outer periphery of intermediate and lower portions 35b of anchor 30 include tapering threads 33. An intermediate portion of anchor body 35 has an annular shoulder 31. Anchor 30 can be made of various metals but is preferably constructed out of a sufficiently malleable material, such as brass; brass threads are softer, deformable, and easier to crush or "crash" than threads made from iron or steel, for example.

To assemble universal insert 20 to an existing RST body, the following steps are performed. First, cap 14 of the RST body is removed and any discharge orifice seat and thermostatic element/s are removed. After the trap is cleaned to remove any dirt and debris, universal nozzle anchor 30 is inserted into a seat (typically a seating or discharge hole) of the RST body (not shown). A socket wrench attached to hex cap 35a can be used to tighten down the anchor. Tightening should continue until the anchor is driven down into a completely secure position so that shoulder 31 contacts a raised or flat RST body portion forming the seat; if the seating or discharge hole diameter is larger than the diameter of the smallest threads 33 (which is the design choice). Some of the smaller threads will be "crashed" or crushed and/or broken off until threads of a size effective for engaging the seating hole are reached. Threads 33 are designed to be thin and deep, permitting them to be "crashable." Should it be necessary, anchor 30 can be removed from the seating hole simply by unscrewing it. If the seating hole does not have threads, the anchor can be secured by knocking it into secure attachment with the seating hole using a hammer.

Next, inner screen 41 is displaced downward (relative to outer screen 43) so that universal screen filter 40 is extended to its maximum height. Now, screen filter 40 is placed in the trap so that inner screen 41 abuts shoulder 31 of anchor 30, and surrounds hex cap 35a. Screen filter 40 should now be standing upright. Finally cap 14 is replaced and slowly tightened; as cap tightening occurs, outer screen 43 is moved in a downward direction relative to inner screen 41 and, thus, the overall height of screen filter 40 is decreased. Following cap tightening screen filter 40 will be firmly secured between cap 14 and the bottom of the RST body, preventing debris from entering nozzle 37.

Referring to FIG. 1, while the filter device shown there has an upper end 43 that is open, those of skill in the art will recognize that the uppermost end of screen filter 40 can be closed (either using wire mesh or a solid piece of material, for example). This may be desirable if cap 14 includes protrusions that might interfere with the engagement of the upper portion of outer screen 43 with the lower portions of cap 43, otherwise permitting debris to enter nozzle 37.

In the preferred embodiment, nozzle 37 is permanently secured to anchor 30, so that the anchor/nozzle assembly is replaced as an integral unit. However, it is envisioned that nozzle 37 could be designed to be removable from anchor 30, using threads or a snap-fit or press-fit assembly. In an alternative embodiment, a narrow orifice could be drilled through anchor 30 (in the manner described in the '209 patent, for example), thereby forming a constricted passageway to prevent the passage of steam while permitting condensate flow; this embodiment would not require the use of a separate, removeable nozzle.

Threads 33 of universal nozzle anchor 30 taper in a downwardly decreasing direction, as shown in FIG. 3, to permit engagement with a variety of RST bodies having seating or discharge holes of different diameters. It has been found that a substantial majority of commercially available RST bodies, including those existing devices in the field, have seating hole diameters in the range of between about 0.5 and 0.6 inches. Therefore, the diameter of threads 33 need only be within this range for most applications. Also, if the seating hole is smaller than the smallest anchor thread size, the seating hole can be hand-drilled to be made larger; thus, it will be understood that the great majority of existing or available RST bodies (possibly as many as 80% of them) can be accommodated using universal insert 20 having anchor threads in the range of between about 0.5 and 0.6 inches.

In the current design, "Type I" and "Type II" universal inserts are used, each of which have the dimensions shown in FIGS. 2 and 3. Type I universal inserts have anchor thread diameters varying between 0.45 and 0.64 inches, with 18 threads/inch. Type II universal inserts have anchor threads varying between 0.55 and 0.70 inches, again with 18 threads/inch. Still referring to FIGS. 2 and 3, the current preferred embodiment, for both the Type I and Type II universal inserts, has the following dimensions (in inches): "a" is 0.250; "b" is 0.872; "c" is 0.080; "d" is 0.700; "e" is 0.150; "f" is 0.250; "g" is 0.213; "h" is 0.372; and "i" is a ⅝ hex. Of course, these dimensions may vary depending on the application, and further research and development, and the claims are not intended to be limited to universal inserts with the specific dimensions given here.

It is currently believed that use of the Type I and Type II universal inserts disclosed here will accommodate more than 90% of both the existing RSTs in the field and commercially available RST models. Thus, universal insert 20 greatly decreases the number of differently-sized RST internal components necessary to service or replace RSTs.

It should be understood that various changes and modifications to the illustrated preferred embodiment will be apparent to those skilled in the art. For example, more than two separate screens can be used to form universal screen filter 40. As another example, the use of an anchor assembly with crashable threads and/or frictionally-engaging screens can be adapted for use with orifice-type devices (as disclosed, for example, in the '209 patent) or even (in a less preferred embodiment) thermostatic-type devices, rather than with the interchangeable nozzles discussed here. Such changes and modifications can be made without departing from the spirit and scope of the present invention and without diminishing its intended advantages. It is, therefore, intended that such changes and modifications be covered by the following claims.

We claim:

1. A universal insert for use with a device for draining condensate from a steam system while minimizing the passage of steam, the universal insert being insertable within a housing connected in-line with the steam system, the housing having a fluid flow conduit and a seat, comprising:

a threaded anchor attachable to the seat, the anchor having a constricted passageway passing through the anchor and communicating with fluid flow within the steam system, the constricted passageway serving to enhance the flow of condensate from the steam system yet restrict the passage of steam, wherein the threads on the anchor taper in a manner so that the thread diameter decreases as the threads are located closer to the seat and wherein the threads are crashable to permit engagement of the anchor with housing seats of differing dimensions.

2. The universal insert of claim 1, further comprising a filter device located adjacent the anchor and configured to surround an upstream portion of the constricted passageway, the filter device having a height which is selectively adjustable.

3. The universal insert of claim 1, wherein the diameter of the tapering threads varies from between about 0.4 and 0.7 inches.

4. The universal insert of claim 1, wherein the anchor has a first tubular nozzle with an internal constricted passageway communicating with the fluid flow conduit.

5. The universal insert of claim 4, the anchor further comprising at least a second tubular nozzle interchangeable with the first nozzle, the second nozzle having an internal constricted passageway which is selected to be different in configuration than that of the first nozzle in order to enable variation in the constricted passageway suitable for operation with different steam pressures and different condensate drainage in the steam systems.

6. The universal insert of claim 1, wherein the anchor includes an orifice having the constricted passageway.

7. The universal insert of claim 1, wherein the anchor threads are made of brass.

\* \* \* \* \*